United States Patent Office 3,567,751
Patented Mar. 2, 1971

3,567,751
COBALT COMPLEXES AND PROCESS
FOR PRODUCING THE SAME
Giacomo Costa and Giovanni Mestroni, Trieste, Italy, assignors to Snam Progetti S.p.A., Milan, Italy
No Drawing. Filed Feb. 16, 1968, Ser. No. 705,906
Claims priority, application Italy, Feb. 17, 1967, 12,760/67
Int. Cl. C07f 15/06; B01j 1/10
U.S. Cl. 260—439    11 Claims

ABSTRACT OF THE DISCLOSURE

A process for producing an organometallic tetradentate complex of cobalt by reacting an organometallic tetradentate complex of cobalt of the formula:

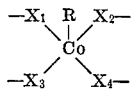

wherein $X_1$, $X_2$, $X_3$ and $X_4$, which form the tetradentate complex, may be the same or different and each represents a nitrogen, oxygen, sulphur or phosphorus atom; and R is an alkyl, aryl, alkaryl or cycloalkyl radical with carbon monoxide or nitrogen monoxide and with a mobile hydrogen compound represented by the formula R'H, said R' being an oxyalkyl, oxyaryl, oxycycloalkyl amino, hydroxy or mercaptan radical, in the presence of visible or ultraviolet radiation is disclosed. The resulting products are also disclosed and claimed. They find particular utility as catalysts in various organic reactions such as oxidations, oxo-reactions and nitrosations.

---

This invention relates to a process for the production of an addition compound of an organometallic complex of cobalt with a polydentate chelating agent by the addition of small unsaturated molecules and mobile hydrogen compounds (active hydrogen-containing compounds).

Organometallic complexes of cobalt with polydentate chelating agents are known. These compounds may contain in their molecule the group having the following general formula:

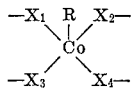

wherein $X_1$, $X_2$, $X_3$ and $X_4$, which may be the same or different each represent a nitrogen, oxygen, phosphorus or sulphur atom, and R is an alkyl, aryl, cyclo-alkyl or alkyl-aryl radical. There may also be present a Lewis base such as water, an amine, phosphine or ether.

We have now found that these compounds when at a high temperature or under radiation may add small unsaturated molecules and mobile hydrogen compounds and may eliminate at the same time the compound RH.

According to the present invention, there is provided a process for producing an addition compound of an organometallic complex of cobalt with a polydentate chelating agent having in the molecule a group having the following general formula:

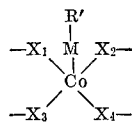

wherein $X_1$, $X_2$, $X_3$ and $X_4$, which may be the same or different, each represent a nitrogen, oxygen, sulphur or phosphorus atom; M represents a small unsaturated molecule; and R' is a radical of a mobile hydrogen compound represented by the formula R'H; and the cobalt ion, which is in the trivalent state, is optionally joined to, as a sixth group, a Lewis base, which process comprises reacting an organometallic complex of cobalt with a polydentate chelating agent having in the molecule a group represented by the following general formula:

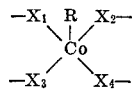

wherein $X_1$, $X_2$, $X_3$ and $X_4$ are as hereinbefore defined and R is an alkyl, aryl, alkaryl or cycloalkyl radical with a small unsaturated molecule and with the mobile hydrogen compound represented by the formula R'H, the reaction being effected in the presence of visible and/or ultraviolet radiation and/or at an elevated temperature, so as to produce the desired product.

The reaction may be effected at a pressure of more than one atmosphere.

An example of a small unsaturated molecule that may be used in the present invention is carbon monoxide or nitrogen monoxide.

Examples of the mobile hydrogen compound include aliphatic alcohols, aromatic alcohols, alkyl aromatic alcohols, carboncyclic and heterocyclic alcohols, aliphatic and aromatic amines and mercaptans, i.e., R' may be an oxyalkyl, oxyaryl, oxycycloalkyl, amino, hydroxyl or mercaptan radical.

The reaction can be represented as follows:

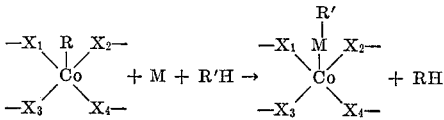

M represents the small unsaturated molecule and R' represents for example an oxy-alkyl, oxy-aryl, oxy-cycloalkyl, amino, hydroxyl or mercaptan group.

The reaction may be effected photochemically, i.e., by way of visible or ultra-violet radiation, or may occur simply by raising the reaction temperature.

When the addition takes place photochemically the radiation used is preferably one having a wavelength lower than 500 m$\mu$. If, on the contrary, the addition is effected thermally, the temperature must be higher than 150° C.

The reaction may be carried out in the presence of a solvent for example an ether or cyclic ether although an excess of the mobile hydrogen compound can act as the reaction solvent. An example of the organometallic compound of cobalt with a polydentate chelating agent is Co (III) Salen i.e. Co (III) (di-salycil-aldehyde-ethylene-di-iminate).

The reaction may be effected under an elevated pressure and this way of operating may be particularly advantageous when the small unsaturated molecule is a gas, for example carbon monoxide.

The compounds according to the present invention may be employed as catalysts in the organic reactions e.g., oxidation, oxoreaction, nitrosation.

The invention will now be illustrated by the following example.

EXAMPLE 500 milligrams of $CH_3$—Co Salen $H_2O$ (di-salycil-aldehyde-ethylene di-iminate) dissolved in 200 cc. of methyl alcohol were introduced into a glass reactor.

The solution was saturated with carbon monoxide and was irradiated by means of a mercury lamp for a period of 15 hours. The solution was then concentrated under vacuum until its volume was reduced to 50 cc. and then 100 cc. of water were added, whereupon a crystalline orange-yellow solid precipitated in a yield of 98%. The product was recrystallised by dissolution in methyl alcohol and precipitation with water. Analysis of the recrystallised product was as follows:

*Analysis.*—Calculated (percent): C, 53.74; H, 4.76; N, 6.96; Co, 14.65. Observed (percent): C, 53.62; H, 4.89; N, 7.1; Co, 14.45.

The band of the C=O group appeared in the infrared spectrum at 1716 cm.$^{-1}$ when the product was dissolved in methylene chloride.

The same product and the same yield were obtained when the 200 cc. of methyl alcohol were replaced by a mixture of 190 cc. of tetrahydrofuran and 10 cc. of methyl alcohol.

What we claim is:

1. Process for producing an organometallic tetradentate complex of cobalt having the formula:

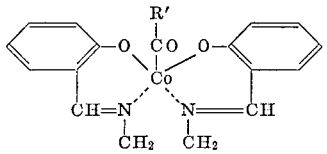

wherein R' is an oxyalkyl radical which comprises reacting an organometallic tetradentate complex of cobalt of the formula:

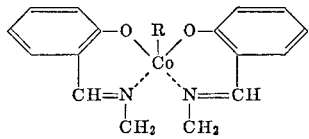

wherein R is alkyl with carbon monoxide and with a mobile hydrogen compound represented by the formula R'H, said R' being an oxyalkyl radical, the reaction being effected in the presence of visible or ultraviolet radiation to produce the desired product.

2. Process according to claim 1 wherein the reaction is effected in the presence of radiation having a wavelength of less than 500 mµ.

3. Process according to claim 1 wherein the reaction is effected in the presence of a solvent.

4. Process according to claim 3 wherein the solvent is an ether.

5. Process according to claim 3 wherein the solvent is an excess of the mobile hydrogen compound.

6. Process according to claim 1 wherein said organometallic tetradentate complex of cobalt is joined to water.

7. Process according to claim 1 wherein R' is methoxy.

8. Process according to claim 1 wherein R is methyl.

9. An organometallic tetradentate complex of cobalt having the formula:

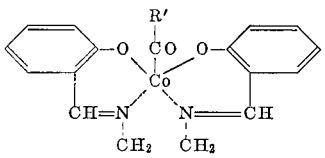

wherein R' is oxyalkyl.

10. A complex according to claim 9 wherein R' is methoxy.

11. A complex according to claim 9 wherein it is joined to water.

References Cited

UNITED STATES PATENTS

| | | | |
|---|---|---|---|
| 2,450,276 | 9/1948 | Fogler et al. | 23—221 |
| 2,508,490 | 5/1950 | Calvin et al. | 260—439 |

OTHER REFERENCES

Chaberek et al.: Organic Sequestering Agents, John Wiley and Sons, New York, N.Y., 1959, pp. 6–8.

TOBIAS E. LEVOW, Primary Examiner

A. P. DEMERS, Assistant Examiner

U.S. Cl. X.R.

204—158; 252—43